United States Patent [19]

Macedo et al.

[11] Patent Number: 4,687,581
[45] Date of Patent: Aug. 18, 1987

[54] METHOD OF SEPARATING AND PURIFYING CATIONS BY ION EXCHANGE WITH REGENERABLE POROUS GLASS

[75] Inventors: Pedro B. Macedo, 6100 Highboro Dr., Bethesda, Md. 20817; Aaron Barkatt, Silver Spring; Herbert G. Sutter, Gaithersburg, both of Md.

[73] Assignee: Pedro B. Macedo, Bethesda, Md.

[21] Appl. No.: 574,986

[22] Filed: Jan. 30, 1984

[51] Int. Cl.$^4$ .............................................. C02F 1/42
[52] U.S. Cl. ................................... 210/670; 210/682; 502/26; 502/27
[58] Field of Search ............... 210/670, 682, 662, 672, 210/656; 252/629; 423/6; 502/25-27

[56] References Cited

U.S. PATENT DOCUMENTS

| | | | |
|---|---|---|---|
| 2,106,744 | 2/1938 | Hood et al. | 106/36.1 |
| 2,215,936 | 9/1940 | Robertson | 273/136 |
| 2,221,709 | 11/1940 | Hood et al. | 106/36.1 |
| 2,272,342 | 2/1942 | Hyde | 49/78.1 |
| 2,326,059 | 8/1943 | Nordberg | 106/52 |
| 2,336,227 | 12/1943 | Dalton | 49/79 |
| 2,340,013 | 1/1944 | Nordberg et al. | 49/79 |
| 3,147,225 | 9/1964 | Ryan | 252/301.1 |
| 4,110,093 | 8/1978 | Macedo et al. | 65/3 R |
| 4,110,096 | 8/1978 | Macedo et al. | 65/30 R |
| 4,432,944 | 2/1984 | Elliott | 210/670 |
| 4,469,628 | 9/1984 | Simmons et al. | 210/682 |

OTHER PUBLICATIONS

Yoldas, J. Mater. Sci., 14, 1843 (1979).
Yoldas, J. Non-Cryst. Solids, 38, 81 (1980).
Mukherjee, Materials Processing in the Reduced Gravity Environment of Space, Elsevier, 1982.

*Primary Examiner*—Ivars Cintins
*Attorney, Agent, or Firm*—Fleit, Jacobson, Cohn & Price

[57] ABSTRACT

A method for separating and purifying cations by ion exchange with regenerable porous glass. More specifically, the method is for decontaminating toxic waste streams such as a radioactive waste streams and concentrating the radioactive cations contained therein which comprises passage of the waste stream through an ion exchange medium of porous silicate glass or silica gel. In one embodiment, a liquid nuclear waste stream is passed through an ion exchange column containing porous silicate glass or silica gel having a plurality of $\equiv$Si—O—Z groups wherein Z represents a non-radioactive cation (hydrogen, alkali metals, Group Ib metals and ammonium cations, and mixtures thereof) to displace the non-radioactive cations of the silicate glass or silica gel by the radioactive cations of the waste stream. Thereafter, the ion exchange medium is contacted with an aqueous solution of an acid to strip the radioactive cations therefrom and the stripped ion exchange medium is regenerated. The stripped ion exchange medium can be regenerated by contacting it with an aqueous basic solution of an alkali metal or ammonium ion. Additional liquid radioactive waste is contacted with the regenerated ion exchange medium to decontaminate an additional volume of liquid waste.

38 Claims, 1 Drawing Figure

METHOD OF SEPARATING AND PURIFYING CATIONS BY ION EXCHANGE WITH REGENERABLE POROUS GLASS

FIELD OF THE INVENTION

This invention relates to a method of separating and purifying cations by ion exchange with regenerable porous glass. More specifically, this invention relates to cleaning radioactive waste stream and is particularly related to decontaminating and concentrating radioactive waste streams by ion exchange with regenerable porous glass. In one aspect, the present invention is concerned with a method of concentrating the radioactive cations of a radioactive waste stream by ion exchange between the radioactive waste stream and a regenerable porous glass. Another aspect of the invention is concerned with regenerating the spent porous glass. Yet another aspect of the invention is related to selective stripping of cations from porous glass to further segregate the cations.

BACKGROUND OF THE INVENTION

Efficient, practical and economically feasible disposal of radioactive wastes is a difficult problem which has commanded consideration attention from nuclear scientists and environmentalists, not to mention the communities and inhabitants of the areas affected by this problem.

Liquid radioactive waste streams are generated in fuel reprocessing and normal nuclear reactor operations. Considering the large quantities of liquid wastes produced in various nuclear installations, efficient cleaning of these wastes and economical disposal of the radioactive cations therefrom are very formidable tasks.

The principal objective in cleaning of radioactive wastes is to separate the radioactive cations from non-radioactive cations and to reduce the waste volume to be disposed. The most common radioactive cations in such waste streams include cesium, strontium, cobalt, barium, yttrium, lanthanum, etc., while the most common non-radioactive cations, or the so-called "inerts", include sodium, lithium and potassium. Also, and in general, the radioactive cations represent a small fraction of the total cations and the inerts represent a small fraction of the liquid waste.

A "high level" waste is produced by dissolving spent nuclear reactor fuel elements. After recovering substantially all of the uranium and plutonium for further use, the remaining solution is usually neutralized with sodium hydroxide for safer storage. This neutralized solution contains large amounts of sodium nitrate salts compared to the radioactive ions present.

The presence of sodium in the solution has several disadvantages. If the sodium-containing waste is stored as a dried salt cake, it is corrosive and will be readily dissolved in water. If the waste is vitrified into a nuclear waste glass, the presence of sodium lowers the chemical durability of the glass and increases the amount of glass which must be disposed.

Thus, in order to effectively clean the liquid nuclear waste, it is important to remove a significant portion, if not all, the sodium ions from the enriched radioactive cation-containing solution. Consequently, ion exchangers are needed which will segregate cesium and strontium from sodium, for example.

Copending application Ser. No. 370,437, filed Apr. 21, 1982, U.S. Pat. No. 4,469,628 which is a continuation of application Ser. No. 39,595, filed May 16, 1979, now abandoned, which is a continuation-in-part of application Ser. No. 959,222, filed Nov. 9, 1978, now abandoned, entitled "FIXATION BY ION EXCHANGE OF TOXIC MATERIALS IN A GLASS MATRIX", describes of a method for the treatment of liquid nuclear waste materials containing radioactive ions by ion exchange with porous silicate glass or silica gel. The porous silicate glass or silica gel employed as the ion exchange media may be prepared in accordance with the methods described in U.S. Pat. No. 4,110,096 to Macedo et al and application Ser. No. 370,437, the disclosures of which are expressly incorporated herein by reference.

In U.S. Pat. No. 4,469,628, nonradioactive cations (i.e., alkali metal, Group Ib metal, and ammonium cations) bonded to silicon through divalent oxygen groups in a porous silicate glass or silica gel matrix are ion exchanged with radioactive ions in the liquid waste. The radioactive ions include radioactive cations and the ion exchange reaction occurs, in particular, on the surfaces of the myriad of interconnecting pores of the silicate glass or silica gel. Thus, the non-radioactive metal or ammonium cations are displaced by the radioactive cations resulting in radioactive cations becoming chemically bonded to silicon or boron through divalent oxygen groups. Thereafter, the resulting porous silicate glass or silica gel may be dried, stored, or packaged or "containerized" in suitable containers or forms, or disposed of as by underground burial or by burial at sea. Desirably, the radioactive silicate glass or silica gel is heated to its sintering temperature to cause partial or complete collapse of the pores and thereby fix and mechanically encapsulate the radioactive cations within the resultant glass matrix.

In concentrating and immobilizing the radioactive cations in accordance with the method described in the aforementioned patent, an essentially "single pass operation" is employed. Once the porous silicate glass or the silica gel is loaded to its capacity, its ion exchange capability is exhausted. This essentially "single pass operation" has limited practical concentration efficiency and economical feasibility where large and voluminous quantities of liquid wastes are involved.

Organic ion exchange media such as Dow HCR-S sold by Dow Chemical Co., Midland, Michigan, have been used to decontaminate radioactive wastes by passing the contaminated radioactive wastes through the organic ion exchange medium. Although organic ion-exchange media are regenerable, the ultimate radioactive loading level of organic ion exchange media is considerably more limited than the inorganic ion exchange media since the former is susceptible to radiation damage at a much lower dosage than the inorganic ion exchange media.

Inorganic ion exchange media have been employed to decontaminate radioactive waste streams. Zeolites, for example, have been used for the extraction of radioactive $Cs^+$ from containment solution because of their preferential extraction of cesium ions over sodium ions. However, the resultant radioactive-containing zeolites are difficult to strip and regenerate; hence, the concentration of the decontaminated solution is limited to what can be achieved in a single pass operation. Moreover, common inorganic ion exchangers such as zeolites are destroyed by acid. The use of inorganic ion exchange media such as zeolites, therefore, is neither an effective method nor an economical one of treating large volumes of liquid wastes.

Sodium titanates also have been used as inorganic ion exchange media but, in general, they suffer from the same disadvantages which are associated with the use of zeolites.

The use of zeolites and titanates present other disadvantages. The disposal of radioactively loaded zeolites and titanates in a cement mix depends largely on their loading levels. Where the loading level is high, they cannot be disposed of as low level waste and must be vitrified. The loading of zeolites and titanates in borosilicate glasses must be kept low otherwise the glass properties will deteriorate.

There also are problems in separating and purifying non-radioactive cations in various fields such as mining, chemical purification, analytical chemistry and toxic waste treatment.

Accordingly, it is an object of this invention to provide an effective and economically attractive and feasible method of separating and purifying cations from liquids.

It is a further object of this invention to provide a method of decontaminating liquid wastes and concentrating the radioactive cations contained therein by multiple-pass ion exchange with porous silicate glass or silica gel.

It is also an object of this invention to provide a method of purifying liquid wastes involving the removal of radioactive-cations and separating them from the sodium contained therein.

It is still another object of this invention to provide a method of regenerating a porous silicate glass or silica gel ion exchanger to enable multiple-pass ion exchange operation.

It is yet another object of this invention to provide an improved method of selectively stripping cations from a loaded ion exchnage medium.

SUMMARY OF THE INVENTION

In accordance with the present invention, cations in various liquids are separated and purified by ion exchange with a regenerable porous glass.

In accordance with one aspect of the present invention, liquid radioactive waste streams are decontaminated by removing the radioactive cations contained therein, and the radioactive cations are concentrated in order to facilitate their disposal.

In accordance with another aspect of the invention, liquid radioactive waste streams are decontaminated by concentrating the radioactive cations contained therein to form a relatively smaller volume of high level waste and a relatively larger volume of low level waste.

In accordance with yet another aspect of the invention, the radioactive ions are segregated from the large number of inert ions. Thus, an ion exchange process is provided which will segregate cesium and strontium from sodium, for example.

The present invention comprises a method of selectively removing cations from a liquid containing the same by passage of the liquid through an ion exchange medium of porous silicate glass or silica gel or any other porous amorphous silicate. The silicate glass or silica gel has an interconnecting porous structure and a plurality of $\equiv$Si—O—Z groups wherein Z represents a cation, specifically hydrogen, alkali metal, Group Ib metal, ammonium or mixtures thereof. The porous silicate glass or silica gel is impregnated with the liquid containing the cations. The cations of the glass are displaced by the cations of the liquid to provide a plurality of the latter cations bonded to Si through divalent oxygen (—O—). The ion exchange medium is then impregnated with an aqueous solution of an acid (e.g., $HNO_3$) to displace the cations with the proton of the acid and provide a plurality of $\equiv$Si—OH groups. Depending upon the characteristics of the stream being treated, the ion exchange medium is then impregnated with an aqueous basic solution of alkali metal or ammonium to provide a regenerated ion exchange medium having a plurality of $\equiv$Si—O—A groups wherein A is a cation of the group consisting or alkali metal, ammonium and mixtures thereof. The regenerated ion exchange medium is then impregnated with additional liquid containing cations thereby effecting a displacement of the cations of the glass or gel with the cations of the liquid. If the liquid containing cations is basic, has a high pH above about 9.5 and has a high alkali content above about 1 molar, such as the typical high level waste produced from spent nuclear reactor fuel elements, it has surprisingly been found that the impregnation of the ion exchange medium with the aqueous basic solution of alkali metal or ammonium can be omitted.

The present invention also includes a method of regenerating porous silicate glass or silica gel having an interconnecting porous structure and having a plurality of cations bonded to silica through divalent oxygen groups (—O—). The method includes the step of impregnating the ion exchange medium with an aqueous solution of an acid to displace the cations of the glass or gel with the proton of the acid. The method also includes impregnating the ion exchange medium with an aqueous basic solution of alkali or ammonium ions to provide a regenerated ion exchange medium.

The present invention further includes a method of segregating ions such as inert ions from radioactive ions. The present inventors have surprisingly found that there is a specific order in which the ions are stripped from the ion exchange medium during the contact between the ion exchange medium and the aqueous solution of an acid. For example, the order of stripping is $Na^+$, $Sr^{++}$, $K^+$; $Cs^+$, with $Na^+$ being stripped first and $Cs^+$ being stripped last. Thus, it is possible to separate the inert ions such as sodium from the radioactive ions such as cesium. This is particularly surprising since one would expect the acid to strip all the alkali metals present on the ion exchanger together and to strip away the strontium, for instance, after the alkali ions have been eluted. Furthermore, acid stripping is not expected to provide high resolution among the various alkali metal ions present on the ion exchanger. It is surprising to find that extremely high separation factors among cesium, potassium and sodium in a single cycle of sorption on a porous glass ion exchanger and acid stripping.

DETAILED DESCRIPTION OF THE INVENTION

It has been discovered that large quantities of liquid radioactive wastes can be treated in accordance with the method of this invention to remove the radioactive cations contained therein.

It has further been discovered that effective and economically feasible concentration of a liquid radioactive waste stream may be effected in a multiple-pass operation which comprises the steps of ion-exchanging radioactive cations of the waste stream with non-radioactive cations of porous glass or silica gel thereby forming a plurality of radioactive cations bonded to the glass or gel through divalent oxygen groups and regenerating of the porous glass or silica gel for repeated ion exchange with the waste stream.

In addition, it has also been unexpectedly discovered that the ion exchange media employed herein (porous glass or silica gel) exhibits a very high preferential selectivity toward cesium relative to sodium and potassium ions. Thus, the ion exchange media can be stripped with an acid solution to form a concentrate containing cesium ions without substantial quantities of sodium ions, for example. In other words, the concentrate contains a much higher proportion of cesium to sodium and potassium than was present in the spent ion exchange media. Specifically, the order of stripping of ions with the acid solution is $Na^+$, $Sr^{++}$, $K^+$, and $Cs^+$. Thus, the process of this invention results in significant decontamination of the waste with simultaneous clean-up of the sodium ions.

More generally the current invention demonstrates that the porous glass ion exchange medium is surprisingly and very effectively capable of providing extremely high selectivity in the separation or purification of cations, especially alkali metal ions. This selectivity is obtained in part during the sorption of cations on the ion exchanger from the original stream and in part during subsequent stripping. For instance, in the separation of cesium from sodium a separation factor of approximately 20 to 50 is obtainable during loading and a factor of 3000 to 8000 during stripping resulting in a separation factor, for example, of about 160000 for a single cycle. High resolution factors and versatility in determining the order of removing and eluting various cations are provided by the strong dependence of the sorptive properties of the porous glass on the pH. For instance, in basic environments $Sr^{++}$ is taken up in preference to potassium and even cesium, while at low pH $Sr^{++}$ is eluted before the two other cations. Thus, extremely narrow pH ranges can be used in loading and recovering specific ations, especially specific alkali metal ions, from the porous glass. The high selectivities obtained are at least comparable with those provided by organic ion-exchange resins. This is very surprising in view of the widely accepted view that organic ion exchangers are superior in selectivity to inorganic ion exchange media, and this can lead to wider applicability of media of the porous glass type in non-radioactive as well as radioactive separations.

Some of the desirable properties of the porous glass ion exchange medium used in the practice of the invention are as follows:

1. It is resistant to radiation so that it does not suffer from radiation damage upon reconcentration;

2. It has high selectivety for radioactive ions relative to sodium ions both in sorption and in retention during stripping;

3. It is regenerable by stripping the radioactive cations therefrom so that it can be reused for repeated ion exchange with liquid radioactive waste;

4. It has a high ultimate loadings;

5. Its ion exchange properties can be readily destroyed so that the radioactive cations can be permanently fixed and immobilized upon heating; and 6. It is not subject to significant volume changes upon loading or stripping it with various ions. (No detectable changes in volume are observed, for instance, when the glass ion exchange medium is converted from the $H^+$ form to the $Na^+$ form and back to the $H^+$ form; under the same conditions, volume changes of the order of 10% are observed in the case of the organic ion exchange medium Dow HCR-S.)

Since the ion exchange medium, i.e., porous glass or silica gel, is regenerated during the process, large volumes of liquid wastes are progressively concentrated by repeated ion exchange operations thereby drastically reducing the level of radioactive materials present in the volume of radioactive waste stream which must be disposed.

The ion exchange medium in accordance with the invention is preferably a porous silicate glass or silica gel. Suitable glass compositions which may be utilized generally contain silicon dioxide ($SiO_2$) as a major component, have a large surface area and have large amounts of silicon-bonded hydroxyl groups ($\equiv Si-OH$) on the surface. The $SiO_2$ content of the porous glass of silica gel desirably is at least about 70 mol percent $SiO_2$, preferably at least about 82 mol percent $SiO_2$, and most preferably at least about 89 mol percent $SiO_2$ on a dry basis. Such glasses are described in the literature, see U.S. Pat. Nos. 2,106,744; 2,215,936; 2,221,709; 2,272,342; 2,326,059; 2,336,227; 2,340,013; 4,110,093; and 4,110,096, for example. The disclosures of the last two mentioned patents are expressly incorporated herein by reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali metal borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. It has been found preferable to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the surface groups present. The porous silicate glass may be in the shape of a suitable geometric or non-geometric container such as a cylinder, or it may be in particulate form such as powder, or conforming to the shape of the container such as a column, nylon bag, cube, plate-like membrane, cylinder, sphere, etc.

The literature also adequately describes the preparation of silica gel compositions which can be employed in this invention. These materials are available, for example, as LUDOX silica gel, sold by E. I. DuPont de Nemours & Co., which contains 0.08 to 0.6 weight percent $Na_2O$ as titrable alkali believed to be present as silicon-bonded NaO-groups.

Another class of materials which can be employed in this invention includes polymerized or partially polymerized systems prepared by means of processes associated with the sol-gel technique and consisting of single-component (in particular, high-silica) or mutli-component (e.g., $Na_2O—B_2O_3—SiO_2, SiO_2—TiO_2$) compositions (Yoldas, J. Mater. Sci., 14, 1843 (1979); Yoldas, J. Non-cryst. solids 38, 81 (1980); Mukherjee, in Materials Processing in the Reduced Gravity Environment of Space, Elsevier, 1982).

The porous silicate glass or silica gel contains a plurality of $\equiv Si—O—Z$ groups wherein Z represents a non-radioactive cation of the group consisting of hydrogen, alkali metal, Group Ib metal, ammonium and mixtures thereof. Specifically, the porous silicate glass or silica gel in the case Z is other than hydrogen contains more than about 0.3 mol percent, preferably more than about 1 mol percent, most preferably more than about 3 mol percent, of non-radioactive metal or ammonium cation oxy groups. The surface to weight ratios for the porous silicate glass and/or silica gel employed in the invention are at least about 0.1 $m^2/g$ to at least several thousand $m^2/g$, e.g., 10,000 $m^2/g$, preferably at least upwards of 100 $m^2/g$. Desirably, the surface to weight ratio of the starting silicate glass or silica gel ranges from about 5 to about 1500 $m^2/g$. In the case of the porous silicate glasses used herein wherein Z is other than hydrogen, the protons of the silicon-bonded hydroxyl groups are ion exchanged with the alkali metal, Group Ib metal and/or ammonium cation, e.g., sodium, potassium, cesium, lithium, rubidium, cupric, cuprous, or ammonium, using salts of these metals, that are capable of exchanging the salt cations for the protons of the silicon-bonded hydroxyl groups, such as their hydroxides, nitrates, sulfates, acetates, bromides, phosphates, chlorides and the like of these metals including silver nitrate, gold nitrate, sodium nitrate, cesium nitrate, lithium nitrate, cupric nitrate and the like. As indicated hereinabove, suitable non-radioactive metal cations for exchange with the protons of silicon-bonded hydroxyl groups, i.e., for attachment to silicon through divalent oxygen and subsequent displacement by the radioactive cations, include sodium, potassium, cesium, rubidium, lithium, copper (cupric and/or cuprous), silver, gold and ammonium.

The proportion or concentration of silicon-bonded hydroxyl groups ($\equiv SiOH$) on the porous silicate glass surfaces can be regulated by regulating the surface area of the porous silicate glass during its preparation as is well-known in the art. Generally, the surface area is controlled by the temperature and time at temperature during the phase-separation portion of the preparation of the porous silicate glass. Thus, the longer the time at temperature and/or the higher the temperature used in the phase-separation, the greater the pore diameter and, therefore, the smaller the surface area per gram in the resulting porous silicate glass. Conversely, the surface area, and thus the proportion of surface $\equiv SiOH$ groups available for ion exchange with alkali metal, Group Ib metal and/or ammonium cations, can be increased by lowering the time and/or temperature of the heat treatment used to induce phase-separation. Any other techniques known by the skilled worker for increasing, or decreasing if desired, the proportion of surface $\equiv SiOH$ groups can be used to provide a porous glass having the desired proportion of surface silicon-bonded hydroxyl protons available for exchange by alkali metal, Group Ib metal and/or ammonium cations.

It is preferred to react the porous silicate glass containing silicon-bonded hydroxyl groups with the appropriate salt of the non-radioactive alkali metal, Group Ib and/or ammonium cation at a sufficiently high pH to bring about the exchange of the metal or ammonium cation of the salt with the proton of the silicon-bonded hydroxyl groups but not so high that substantial amounts of the glass dissolves or begins to dissolve. There is a loss of surface area associated with this dissolution of the porous glass at excessively high pH's and thus a loss of silicon-bonded hydroxyl groups and/or silicon-bonded non-radioactive metal or ammonium cation oxy groups. A preferred method of exchanging the protons of silicon-bonded hydroxyl groups is to treat the porous silicate glass with a salt of the alkali metal, and/or Group Ib metal buffered with ammonium hydroxide or otherwise buffered at a pH of about 11 to 13. It has been found that the buffering with ammonium hydroxide of the primary ion exchange of said non-radioactive metals for the protons of the silicon-bonded hydroxy groups in this manner avoids significant loss of glass or surface area.

The proportion of silicon-bonded alkali metal oxy, Group Ib metal oxy and/or ammonium oxy groups can be regulated by several techniques. Of course, the proportion of silicon-bonded hydroxyl groups in the porous glass will determine generally the maximum amount of silicon-bonded metal or ammonium oxy groups obtainable. Longer times of contact of the alkali metal, Group Ib metal and/or ammonium hydroxides and/or salts with the porous glass will increase the proportion of silicon-bonded metal or ammonium oxy groups. Also, the smaller the particle size of the porous glass, the greater the proportion of silicon-bonded metal oxy or ammonium oxy groups within a given time. Any other suitable technique can be used to regulate the proportion of silicon-bonded metal oxy or ammonium oxy groups to the desired level.

The present invention also contemplates using porous silicate glass or silica gel having a plurality of $\equiv Si—O—Z$ groups wherein Z is hydrogen, i.e., the proton of the silica-bonded hydroxyl groups has not been ion-exchanged with a metal or ammonium ion. However, this ion exchange medium with silicon-bonded hydroxyl groups is only used with certain types of liquid waste. The liquid containing radioactive cations must be basic, have a high pH above about 9.5 and have a high alkali content above about 1 molar. The most typical waste having these characteristics is the high level waste produced from spent nuclear reactor fuel elements.

Before describing the process of this invention in detail, several terms and expressions used throughout this application require definition.

The term "influent" is intended to refer to the contaminated aqueous solution containing the radioactive cations and the non-radioactive cations or inerts.

"Effluent" refers to the solution flowing out of the ion exchange column after the ion exchange step.

"Decontamination Factor" or its abbreviation "DF" for any ion is the ratio of the concentration of that ion in the influent to the concentration of that ion in the effluent.

"Breakthrough" refers to the level at which the concentration of the ions in the effluent exceeds a predetermined concentration.

"Capacity" refers to the number of column volumes needed to bring the DF to 2.

The process of this invention broadly comprises:

(a) passing the influent stream containing the radioactive cations through an ion exchange column containing porous glass or silica gel having a plurality of ≡Si—O—Z groups wherein Z represents a non-radioactive cation, i.e., hydrogen, alkali metal, Group Ib metal or ammonium cations whereby non-radioactive cations of the glass are displaced by the radioactive cations of the liquid to provide a plurality of radioactive cations bonded to Si through divalent oxygen (—O—). The flow of influent stream is normally continued until the ion exchange capacity of the ion exchange medium has been essentially exhausted, i.e., the concentration of the radioactive cations in the effluent stream has reached the breakthrough level;

(b) interrupting the influent flow and passing an aqueous acid solution of an acid such as a mineral acid, e.g., $HNO_3$, $HCl$, $H_2SO_4$, $H_3PO_4$ or $HClO_4$, through the ion exchange column to strip the radioactive cations, which are bonded to the Si through divalent oxygen (—O—), thereby providing a plurality of ≡Si—OH groups;

(c) regenerating the ion exchange medium by passing through the ion exchange column a solution of alkali metal or ammonium ions to provide a plurality of ≡Si—O—H groups wherein A is a non-radioactive cation of the group consisting of alkali metal, ammonium and mixtures thereof. The alkali metal or ammonium ions will displace the protons on the porous glass and the porous glass is thus regenerated for further ion exchange with more influent; and (d) passing more influent through the ion exchange column as in step (a) and repeating steps (b) and (c). If the influent stream is a basic liquid having a high pH (i.e., above about 9.5) and a high alkali metal or ammonium content (i.e., above about 1M), step (c) can be omitted.

Thus, it is seen that the process of this invention is capable of decontaminating liquid nuclear waste ion exchange operations involving regeneration of the ion exchange medium and its reuse for further ion exchange.

Referring in more detail to the operation of the invention in accordance with one embodiment, the process of this invention comprises:

(a) passing through an ion exchange column containing ion exchange medium an influent stream containing radioactive cations such as $Cs^{134}$, $Cs^{137}$, $Sr^{90}$, $Sr^{89}$, $Ba^{137}$, etc. The ion exchange medium in the column is porous glass or silica gel having a plurality of ≡Si—O—Z groups wherein Z represents a non-radioactive cation (hydrogen, alkali metal, Group Ib metal or ammonium cations). The influent stream is passed through the ion exchange column until the ion exchange capacity of the ion exchange medium has been substantially exhausted and the porous glass or silica gel has become loaded with the radioactive cations. This is attained when the radioactive cations in the effluent stream reach the breakthrough level. At this point, the flow of influent is discontinued;

(b) passing an aqueous solution of an acid such as a mineral acid, e.g., $HNO_3$, $HCl$, $H_2SO_4$, $H_3PO_4$ and $HClO_4$ through the exhausted ion exchange medium in the column. The preferred acid is $HNO_3$ since HCl is corrosive to stainless steel and $H_2SO_4$, $H_3PO_4$ and $HClO_4$ cannot easily be evaporated to concentrate the strip solution. The pH of the stripping effluent is adjusted to maximize the concentration of the ions to be stripped (e.g., less than about 1 for $Cs^+$). The resulting solution will contain a higher concentration of radioactive cations than the influent, and is stored separately from the effluent. The concentration of the radioactive cations to sodium ions in the resulting solution is at least about 10, preferably at least about 100 and most preferably at least about 1000 times the ratio of concentrations of said ions in the influent;

(c) evaporating most of the acid from the resulting solution and preferably recycling the clean acid condensate. The remainder or concentrated waste is neutralized with sufficient base (e.g., LiOH) to raise its pH to above about 4;

(d) passing the resulting neutralized solution from step (c) through the ion exchange column defined in step (a) or it may be passed through another ion exchange column containing fresh porous glass or silica gel of the same composition described in step (a). This treatment traps the "concentrated radioactive ions" on the porous glass or silica gel to form a much higher concentration of radioactive cations on the porous glass or silica gel than was achieved in step (a);

(e) passing a solution of alkali metal or ammonium ions (e.g., a solution of alkali metal nitrate such as sodium nitrate and ammonium hydroxide) at a pH of about 11 to 13 through the ion exchange column. The alkali metal and ammonium ions in the solution displace the radioactive cations on the porous glass or silica gel thus regenerating the ion exchange medium for further ion exchange with the influent; and (f) passing more influent through the regenerated porous glass as in step (a) and repeating steps (b), (c), (d) and (e) until the desired concentration of the radioactive cations has been achieved.

Figure 1:
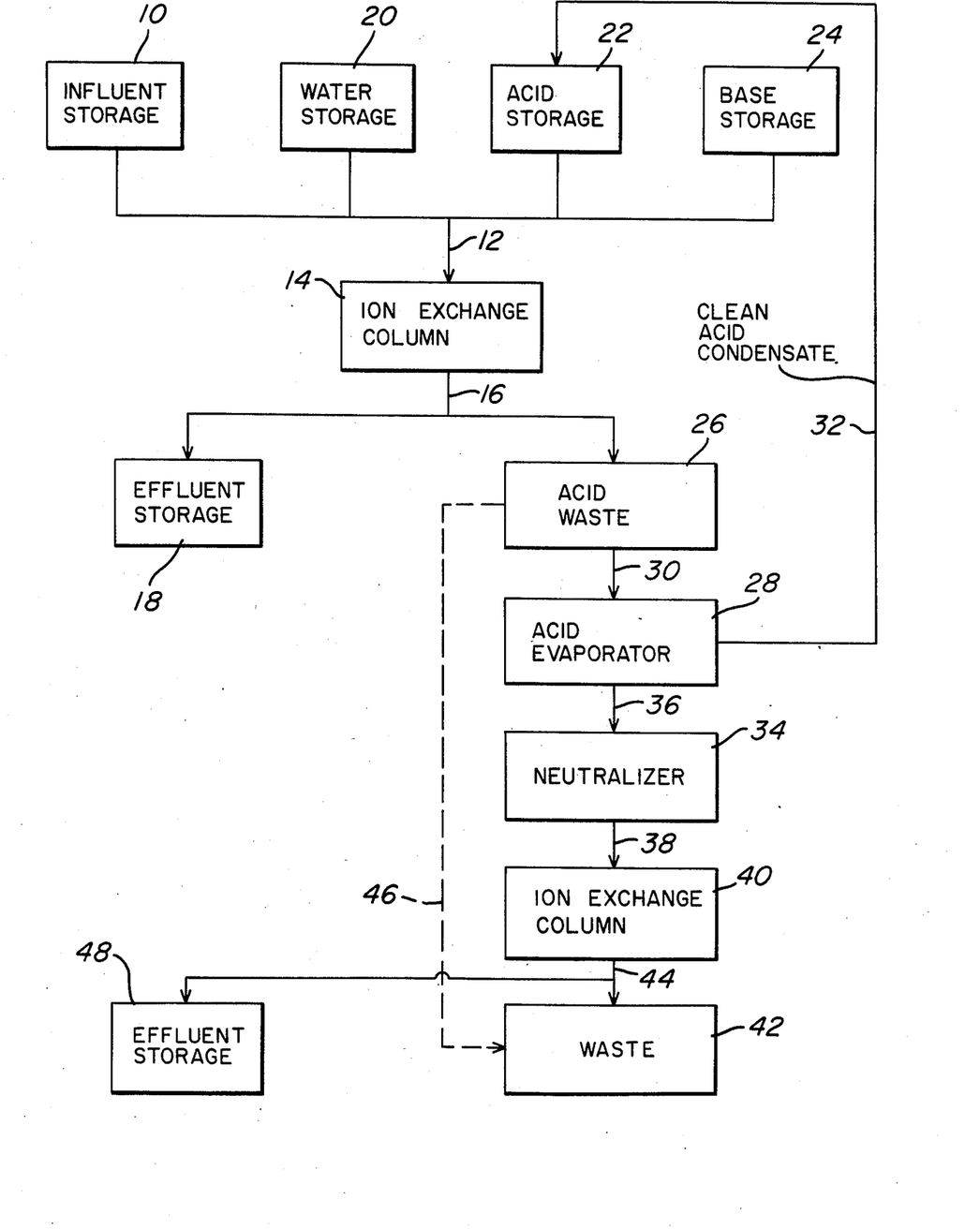
The figure is a schematic block diagram illustrating one embodiment of the process of the present invention.

Referring now to the drawing which illustrates one embodiment of the process of this invention liquid waste from influent storage vessel 10 is introduced via line 12 into an ion exchange column 14 containing the ion exchange medium. After ion exchange with the porous glass or silica gel having the plurality of ≡Si—O—Z groups, the decontaminated stream (effluent) is conducted via line 16 into a storage vessel 18 wherein the decontaminated stream is stored. As previously mentioned, the flow of influent through the ion exchange column 14 normally is continued until the ion exchange capacity of the porous glass has been essentially exhausted.

After the ion exchange capacity of the medium has been exhausted, water from storage vessel 20 is passed through the ion exchange column 14 via lines 12 and 16 and stored or recycled back to vessel 20. The water washes out the influent and separates the influent from the acid stripping solution.

The radioactive cations on the glass then are stripped by an aqueous solution of an acid such as a mineral acid, e.g., HCl, $HNO_3$, $H_2SO_4$, $H_3PO_4$ or $HClO_4$ contained in acid storage vessel 22. The stripping solution is introduced into column 14 through line 12, stripping the radioactive cations from the porous glass or silica gel and leaving the column via line 16.

Since the ion exchange medium has preferential selectivity toward radioactive ions such as cesium and strontium ions over inert ions such as sodium ions, the separation of the radioactive ions from the inert ions can be further enhanced by separately collecting different fractions of the acid stripping solution leaving the ion exchange column 14. In other words, the first fraction leaving the column 14 will contain a higher concentration of inert ions relative to radioactive ions than a later second fraction. Thus, by separately collecting the first and second fractions, the separation of radioactive ions from inert ions will be enhanced. The first fraction will have a higher concentration of inerts and the second fraction, collected subsequently to the first fraction, will have higher concentration of radioactive cations.

In order to improve the separation of the two fractions and minimize the volume of the highly radioactive second fraction a stronger (e.g., nitric vs. acetic acid) or more concentrated (e.g., 1M vs. 0.1M) acid composition may be used after the first fraction has been collected.

We have found that the first and second fractions can be distinguished by monitoring the pH of the solution in line 16 immediately downstream from column 14. The pH of the solution will drop dramatically between the first and second fractions. Specifically, most of the sodium ions, for example, are stripped without a significant drop in pH. Thus, by simply noting a drop in pH, without the necessity for complete analysis, the second fraction containing the relatively high concentration of radioactive cations can be identified and collected. Generally, the second fraction will be collected when the pH drops below about 7, preferably below about 4.

After stripping the radioactive cations, the porous glass is washed with water from water storage vessel 20 and regenerated by an aqueous basic solution of alkali metal or ammonium ions at a pH of about 11 to 13 and a molarity of about 0.5 to 7 stored in base storage vessel 24. The regeneration solution in introduced into column 14 via conduit 12, leaving the column via conduit 16. The regenerative solution leaving the ion exchange column 14 through conduit 16 may be stored or recycled back to vessel 24.

Since the regenerating solution is high in cation concentration when high level waste is processed, it may significantly increase the amount of low level waste produced. Thus, it is desirable to avoid the regeneration step. The regeneration step may be avoided if the liquid waste containing radioactive cations is basic, has a pH above about 9.5 and has a high alkali content above about 1 molar, such as the typical high level waste produced from spent nuclear reactor fuel elements. However, high level waste typically contains large quantities of carbonates. If the high level waste is passed through the column 14 after acid stripping, large volumes of carbon dioxide gas will be generated deteriorating the performance of the column. To avoid this potential problem, a weak or dilute base is placed in base storage vessel 24 and fed through column 14 in place of the regeneration solution. The weak base may be, for example, sodium borate or sodium phosphate having a pH of about 7 to 13, preferably from about 9 to 12. The dilute base may be, for example, 0.1M sodium hydroxide. This basic solution will only regenerate a small fraction of the ion exchange media, typically less than 10%, but raises the pH of the ion exchange media sufficiently to prevent significant deterioration of the column due to gas formation.

After regenerating the ion exchange media, more influent from vessel 10 is introduced into the ion exchange column 14 and the foregoing steps are repeated at least for one additional cycle.

The solution leaving the ion exchange column 14 through conduit 16 after acid stripping is introduced into an acid waste vessel 26. The stripping solution containing large concentrations of the radioactive cations is neutralized. Neutralization of the stripping solution may be effected by treatment with a solution of base (e.g., LiOH) until the pH of the resulting solution is raised above about 4. Preferably, the neutralization step is carried out by passing the acid waste to acid evaporation vessel 28 via line 30 and evaporating most of the acid from the solution in vessel 28. The clean acid condensate is returned to acid storage vessel 22 via line 32 and the concentrated waste is passed to neutralizer 34 via line 36. The neutralized solution from vessel 34 may be conducted through a line 38 into another ion exchange column 40 and the effluent from this column is introduced into an effluent storage vessel 48 via line 44. Column 40 is similar to column 14 and contains porous glass or silica gel as the ion exchange medium. In practice, column 40 may be a second column or it may be a regenerated column 14.

Since the concentration of the radioactive cations in the stripping solution in vessel 26 is substantially higher than the concentration of these ions in the influent (from vessel 10), column 40 is exhausted more rapidly than column 14. However, at their respective exhaustion levels, the concentration of the radioactive cations in column 40 is considerably higher than the concentration of these ions in column 14.

Upon completion of the process and concentrating the radioactive cations, the choice of the final product depends on where the radioactive cations are to be disposed. If the radioactive cations are needed in solution, the ion exchange medium in column 40 is stripped and the stripping solution is introduced into waste vessel 42 via line 44. There has been some recent progress into utilization of radioactive isotopes as sources for beneficial uses such as sterilization of foods and sewage by radiation, use of electrical or light sources for remote locations, etc. Thus, the ultimate use of the present invention is to concentrate radioactive waste to the point they can be sold as sources.

However, if the radioactive cations are to be disposed, then the contents of the ion exchange column 40 are directly introduced into waste vessel 42 via line 44. The waste in waste vessel 42 may be handled in any of several ways. For example, the waste can be stored, made into glass in a glass melter, or evaporated to dryness and the solids calcined. A suitable method to vitrify the ion exchange medium is disclosed in Ser. No. 444,176, filed Nov. 24, 1982, the disclosure of which is expressly incorporated herein by reference. In some cases, the solution in acid waste vessel 26 will be passed directly to waste vessel 42 via line 46.

The following examples will serve to further illustrate the present invention. It is to be understood, however, that these examples are not intended to limit the scope of this invention either with respect to the operation of the process or the reactants and the conditions used, all of which may be varied by those skilled in the art based on the foregoing detailed description.

EXAMPLES

Glass Preparation

An alkali-borosilicate having the following nominal composition (on weight basis) was melted at about 1400° C.:

| | |
|---|---|
| $SiO_2$ | 60% |
| $B_2O_3$ | 32% |
| $Na_2O$ | 4% |
| $K_2O$ | 4% |

The melted material was then crushed and sieved to collect grains having particle sizes in the range specified below, and heated for 2 hours at 550° C. This treatment resulted in phase separation and interconnected microstructure. The resulting material was then treated with hot 3 N HCl, whereby the alkali-borate rich phase was leached leaving a porous glass consisting of approximately 95 weight percent $SiO_2$ and 5 weight percent $B_2O_3$ with trace amounts of $Na_2O$ and $K_2O$. After leaching the residual, HCl was removed by rinsing with de-ionized water resulting in Glass A.

The resulting porous glass powder, Glass A, was then placed in an aqueous solution of 3.5 molar $NaNO_3$ and 3.75 molar $NH_4OH$ at a pH of approximately 11.9 in order to replace the protons on the hydrolyzed pore surface of the glass with sodium ions ($Na^+$) and ammonium ions ($NH_4^+$) by ion exchange resulting in Glass B.

Description of Influent

The influent used in the following examples was a simulation of the supernatant at West Valley Reprocessing Plant, West Valley, New York. The composition is given in Table I. The solution was prepared using the chemicals given in Table I in the reported concentrations.

TABLE I

| West Valley Composition | |
|---|---|
| Component | Nominal Concentration grams |
| $H_2O$ | 302.4 |
| NaOH | 3.07 |
| $NaNO_3$ | 105.5 |
| $NaNO_2$ | 54.5 |
| $Na_2SO_4.10\ H_2O$ | 13.35 |
| $NaHCO_3$ | 7.45 |
| $KNO_3$ | 6.35 |
| $Na_2CO_3.H_2O$ | 4.42 |
| $K_2CrO_4$ | 0.0895 |
| NaCl | 0.82 |
| $Na_3PO_4.12\ H_2O$ | 0.665 |
| $Na_2MoO_4.2\ H_2O$ | 0.121 |
| $Na_2B_2O_4.8\ H_2O$ | 0.1045 |
| $CsNO_3$ | 0.0935 |
| NaF | 0.088 |
| $RbNO_3$ | 0.0208 |
| $Sr(NO_3)_2$ | 0.0121 |
| Cs-137 | 5.4 µCi/L |

Experimental Equipment

The glass ion exchange medium was loaded in a 13 mm diameter glass tube held between two stainless steel frits. The column volume varied for each experiment as shown in Examples 1, 2 and 3. The rest of the system was made of stainless steel or plastic. A pump was used to pass the solutions through the ion exchange columns at a rate of 1 column volume per hour. The 10 ml samples of the effluent taken at appropriate intervals were analyzed for Cs-137 using a 3×3 sodium iodide detector enclosed in a low background cave and a multichannel analyzer.

Analysis of a 10 ml sample of the influent yielded approximately 88,000 counts in 10 minutes. The corresponding background was of the order of 300 counts.

EXAMPLE 1

A 15-ml sample of Glass A (leached, washed) with a particle size of 350 to 710 microns was washed with 4 column volumes of 0.1 N NaOH to bring the pH of the glass above 9 and placed in the column. The data obtained when the simulated West Valley influent was passed through the glass column are given in Table II. The capacity of the glass (i.e., the number of column volumes passed through the column until the decontamination factor falls to 2) is 5.

TABLE II

| West Valley Simulation Glass A | |
|---|---|
| Column Volume | DF |
| 0.267 | >1000 |
| 1.267 | 49.69 |
| 2.267 | 9.45 |
| 3.267 | 4.58 |
| 3.867 | 3.05 |
| 4.600 | 2.34 |
| 5.367 | 1.906 |
| 6.233 | 1.652 |
| 7.00 | 1.278 |

EXAMPLE 2

A 15-ml sample of Glass B (pre-ion exchanged) with a particle size of 180 to 355 microns was placed in the column. The simulated West Valley influent was passed through the glass column and effluent samples were taken every hour, i.e., approximately every column volume. In addition to the radiochemical analysis for Cs-137 chemical analysis of potassium and sodium was also carried out using dc plasma spectrometry and atomic absorption. The potassium and sodium data are represented in terms of DF (influent concentration: effluent concentration) similarly to the cesium data. The pH of the column effluent was monitored by means of a glass electrode. (Slight negative errors in pH measurement can be expected because of the high concentration of sodium in the influent).

Following the passage of the simulated West Valley influent (designated as WVl) during the first 18 column volumes, the column was washed with one column volume of water, stripped with 1M $HNO_3$, washed again with water, treated with a 0.066M sodium tetraborate (borax, $Na_2B_4O_7 10H_2O$) solution to raise the pH. Following this cycle of loading, stripping and pH adjustement, two similar cycles were carried out. The results are summarized in Table III.

It should be noted that upon passing the stripping and pH adjusting solutions the DF values for Cs, K and Na are still calculated relative to the WVI influent to represent the amount of these ions being leached into those solutions compared with the original feed solution.

This Example shows that the glass column can be regenerated and used again at least twice to take up ions such as cesium from the solution. The column capacity of the original column is (13.5±1) column volumes, after the first regeneration it is (7±1) column volumes and after the second cycle it is (6±1) column volumes. It also shows that cesium sorption on the column proceeds with a high decontamination factor long after the column has become saturated with respect to sodium and potassium. Further cesium uptake probably proceeds through displacement of sodium and potassium from sites occupied by these ions. Conversely, upon stripping with 1M $HNO_3$ cesium is retained upon the column for a relatively long time, during which most of the sodium and potassium have already been displaced from the column. Significantly, the cesium is eluted in a small, highly concentrated fraction which leaves the column when the pH of the effluent becomes acidic. The cesium concentration in this fraction is up to 5.5 times its concentration in the influent (DF=0.18), and the Cs:Na ratio is 320 times higher than in the effluent. Using the pH drop as a marker the high-cesium fraction can be easily isolated and collected separately. Most of the potassium on the column is removed by the acid along with the sodium prior to the pH drop, although it shows a slight increase in concentration (by a factor of approximately 2) just during the pH drop. The results indicate that separation can probably be improved by a change of eluent composition during the stripping process (see Example 3).

The results also show that the borax solution used following the acid stripping stage is contaminated with extremely low levels of Cs (effective DF above 300, usually above 1000) and remains largely clean. Water used to rinse the column immediately before the borax treatment likewise remained almost completely non-contaminated.

Further observations made during the various stages of the experiment showed that no dissolution of the glass of the column (indicated by loss of height or formation of voids) could be detected. Furthermore, no release of gas was observed throughout the experiment despite the presence of high levels of carbonate in the influent (see Table 1). The pre-treatment of the column with borax prior to the introduction of the influent in the second and third cycles is sufficient to raise its pH to a high level (above 9) that prevents formation and release of $CO_2$. The borax treatment avoids the need to introduce ammonia (which is potentially gas-forming) or NaOH (which dissolves the glass rapidly). Although it does not lead to complete regeneration of column capacity, the use of borax followed by the high-sodium influent produces a capacity which is approximately one-half the capacity of the original glass. The capacity of the borax-treated glass is similar to that of the leached, washed Glass A (Example 1). Both Glasses A and B are shown in Examples 1 and 2 to be effective in cleaning large quantities of sodium ions, in excess of 40 mol/1 for Glass B and in excess of 24 mol/1 for Glass B, from contamination by cesium.

TABLE III

| Cycle | Influent | Column Volumes | Cs | DF K | Na | pH |
|---|---|---|---|---|---|---|
| I | WV1 | 0.8 | 890 | 21 | 5.6 | 8.1 |
| I | WV1 | 1.7 | 930 | 2.2 | 2.4 | 8.1 |
| I | WV1 | 2.7 | >1000 | 1.0 | 1.7 | 8.9 |
| I | WV1 | 4.7 | >1000 | 1.0 | 1.5 | 9.6 |
| I | WV1 | 6.7 | >1000 | 1.0 | 1.3 | 9.9 |
| I | WV1 | 7.7 | 200 | 1.0 | 1.2 | 9.9 |
| I | WV1 | 8.7 | 44 | 1.0 |  | 9.9 |
| I | WV1 | 9.7 | 14 | 1.0 |  | 10.0 |
| I | WV1 | 10.7 | 6.3 | 1.0 |  | 10.0 |
| I | WV1 | 11.7 | 3.5 | 1.0 | 1.0 | 10.0 |
| I | WV1 | 12.6 | 2.4 | 1.0 | 1.0 | 10.0 |
| I | WV1 | 13.6 | 1.9 | 1.0 | 1.0 | 10.0 |
| I | WV1 | 15.5 | 1.4 | 1.0 | 1.0 | 10.0 |
| I | WV1 | 17.5 | 1.2 | 1.0 | 1.0 | 10.0 |
| I | $HNO_3$ | 21.3 | 1.3 | 1.0 | 1.8 | 10.1 |
| I | $HNO_3$ | 21.9 | 2.1 | 2.7 | 1.7 | 10.4 |
| I | $HNO_3$ | 22.7 | 2.6 | 3.7 | 2.3 | 10.4 |
| I | $HNO_3$ | 23.5 | 3.8 | 4.8 | 6.1 | 10.4 |
| I | $HNO_3$ | 24.4 | 0.39 | 2.1 | 18 | 1.5 |
| I | $HNO_3$ | 25.3 | 0.18 | 3.4 | 57 | 0.2 |
| I | $HNO_3$ | 26.1 | 0.36 | 13 | 170 | 0.2 |
| I | $HNO_3$ | 27.0 | 0.94 | 38 | 1800 |  |
| I | $HNO_3$ | 27.8 | 2.2 | 65 | 590 | 0.1 |
| I | $HNO_3$ | 29.4 | 8.9 | 230 |  | 0.0 |
| I | $HNO_3$ | 32.8 | 106 | 2100 | 6900 | 0.1 |
| I | $HNO_3$ | 43.3 | 400 | 3200 | 15000 | 0.2 |
| I | Borax | 48.8 | >1000 | 5000 | 26000 | 1.3 |
| I | Borax | 57.0 | >1000 | 690 | 62 | 9.1 |
| II | WV1 | 62.0 | >1000 | 100 | 13 | 9.1 |
| II | WV1 | 62.6 | 310 | 2.6 | 3.0 | 8.4 |
| II | WV1 | 63.4 | 233 | 1.0 | 2.0 | 8.5 |
| II | WV1 | 64.1 | 126 | 1.0 | 1.6 | 8.8 |
| II | WV1 | 64.8 | 27 | 1.0 | 1.3 | 9.1 |
| II | WV1 | 65.4 | 8.5 | 1.0 | 1.2 | 9.3 |
| II | WV1 | 66.1 | 4.4 | 1.0 |  | 9.4 |
| II | WV1 | 66.8 | 3.1 | 1.0 | 1.1 | 9.5 |
| II | WV1 | 67.4 | 2.3 | 1.0 | 1.2 | 9.6 |
| II | WV1 | 68.1 | 1.9 | 1.0 | 1.1 | 9.7 |
| II | WV1 | 70.6 | 1.5 | 1.0 | 1.1 | 9.7 |
| II | $HNO_3$ | 73.3 | 1.1 |  |  | 9.8 |
| II | $HNO_3$ | 74.3 | 2.7 |  |  | 10.3 |
| II | $HNO_3$ | 75.2 | 6.2 |  |  | 10.5 |
| II | $HNO_3$ | 76.2 | 2.8 |  |  | 10.0 |
| II | $HNO_3$ | 77.1 | 0.44 |  |  | 4.0 |
| II | $HNO_3$ | 78.0 | 0.48 |  |  | 0.6 |
| II | $HNO_3$ | 78.8 | 1.4 |  |  | 0.3 |
| II | $HNO_3$ | 81.3 | 3 |  |  | 0.2 |
| II | $HNO_3$ | 85.4 | 138 |  |  | 0.2 |
| II | Borax | 90.2 | >1000 |  |  | 1.1 |
| II | Borax | 98.6 | 770 |  |  | 9.0 |
| III | WV1 | 99.8 | 220 |  |  | 9.3 |
| III | WV1 | 100.4 | 96 |  |  | 9.2 |
| III | WV1 | 101.3 | 66 |  |  | 8.7 |
| III | WV1 | 102.4 | 52 |  |  | 8.8 |
| III | WV1 | 103.1 | 12 |  |  | 9.2 |
| III | WV1 | 103.7 | 4.6 |  |  | 9.4 |
| III | WV1 | 104.5 | 2.7 |  |  | 9.5 |
| III | WV1 | 105.2 | 1.8 |  |  | 9.6 |
| III | WV1 | 109.8 | 1.2 |  |  | 10.0 |
| III | $HNO_3$ | 113.9 | 10.9 |  |  | 10.9 |
| III | $HNO_3$ | 115.0 | 8.8 |  |  | 10.6 |
| III | $HNO_3$ | 116.1 | 0.57 |  |  | 2.4 |
| III | $HNO_3$ | 116.8 | 0.60 |  |  | 0.4 |
| III | $HNO_3$ | 117.9 | 2.1 |  |  | 0.3 |
| III | $HNO_3$ | 120.7 | 25 |  |  | 0.2 |
| III | $HNO_3$ | 133.8 | 450 |  |  | 0.2 |

EXAMPLE 3

A simulated West Valley influent was prepared according to Table I. No radioactive tracer was added and effluent analysis was carried out using flame emission for cesium and dc plasma spectrometry for strontium, potassium and sodium. In one test the solution was passed through a 5-ml column of Glass A (leached, washed) and in another test it was passed through a 5-ml column of Glass B (pre-ion-exchanged). The flow rate was much higher than in the case of Examples 1 and 2, amounting to 30 column volumes/hour instead of 1 column volumes/hour. Accordingly, the observed decontamination factors were much lower, not exceeding initial values of 6 for Cs and 18 for Sr (see Table IV). In agreement with the observations made in Examples 1 and 2, the column capacity for Cs was higher by a factor of approximately 2 in the case of Glass B (an observed capacity of approximately 10 column volumes compared with about 5 column volumes in the case of Glass A). The major conclusion was that column capacities for strontium were much higher than those observed for cesium. At the end of the passage of 70 column volumes of influent no reduction in decontamination factor for Sr was observed with either of the two glasses.

Following this part of the experiment the spent column of Glass B was rinsed with 20 column volumes of de-ionized water flowing out at a rate of 1 column volume per minute. This operation was followed by stripping the column with nitric acid. In order to attempt improving the separation among the various ions to be eluted from the column the eluent composition was changed during the stripping process, replacing 0.1M nitric acid by 1M nitric acid. The results are summarized in Table V.

The results in Table V show that all four types of ions on the glass (Na+, K+, Cs+ and Sr2+) can be stripped away when an acidic eluent is passed through the column. However, the main conclusion is that it is possible to obtain very good resolution in separating these ions from each other in fractions eluted from the porous glass ion-exchanger, especially upon using more than one eluent composition sequentially. In the present Example, most of the sodium is eluted while the pH of the column is still alkaline. As it is brought down to the moderately acidic range using a dilute (0.1M) acid most of the strontium comes off, followed by the bulk of the potassium. Most of the cesium stays on the column during the passage of 13 column volumes of 0.1M HNO₃, but when 1M HNO₃ is substituted for the dilute acid the bulk of the cesium is eluted. At this stage the cesium fraction is very clean, containing about 0.5% Na and 1.2% K. The initial West Valley influent composition (Table I) includes approximately 173 g of sodium, 8.12 g of potassium and 0.211 g of cesium per liter, i.e., a Na:Cs ratio of 820 and a K:Cs ratio of 39. Accordingly, a single cycle of sorption and gradual stripping from a porous glass ion exchanger is shown to give rise to purification factors of approximately 160000 for cesium with respect to sodium and of approximately 3300 for cesium with respect to potassium.

TABLE IV

| Glass | Column Volumes | DF Cs | DF Sr | pH |
|---|---|---|---|---|
| A | 5 | 1.8 | 1.9 | 10 |
|  | 10 | 1.3 | 2.9 |  |
|  | 20 | 1.1 | 2.6 | 10.5 |
|  | 35 | 1.2 | 2.8 |  |
|  | 50 | 1.1 | 3.0 |  |
|  | 70 | 1.1 | 3.9 |  |
| B | 5 | 6.0 | 16 |  |
|  | 10 | 1.9 | 18 | 10.5 |

TABLE IV-continued

| Glass | Column Volumes | DF Cs | DF Sr | pH |
|---|---|---|---|---|
|  | 20 | 1.2 | 14 | 10.5 |
|  | 30 | 1.0 | 11 |  |
|  | 45 | 1.0 | 14 |  |
|  | 60 | 1.0 | 16 |  |

TABLE V

| Influent | Column Volumes[a] | Flow Rate CV/hour | pH | Na | K | Cs | Sr |
|---|---|---|---|---|---|---|---|
| Water | 80 | 60 |  |  |  |  |  |
| 0.1 M HNO₃ | 84 | 24 | 10.7 | 1950 | 140 | 1.87 | 0.598 |
| 0.1 M HNO₃ | 88 | 24 | 10.7 | 2280 | 200 | 3.91 | 0.685 |
| 0.1 M HNO₃ | 92 | 20 | 2.5 | 1030 | 1130 | 37.6 | 50.3 |
| 0.1 M HNO₃ | 92.3 | 2.4 | 2.0 | 113 | 7800 | 63.9 | 10.8 |
| 0.1 M HNO₃ | 92.52 | 1.2 | 1.3 | 326 | 1020 | 62.5 | 14.0 |
| 0.1 M HNO₃ | 92.77 | 1.2 | 1.3 | 303 | 991 | 91.7 | 15.2 |
| 0.1 M HNO₃ | 93.02 | 1.2 | 1.3 | 249 | 925 | 83.5 | 9.67 |
| 0.1 M HNO₃ | 93.52 | 15 | 1.1 | 125 | 641 | 93.6 | 7.28 |
| 0.1 M HNO₃ | 94.00 | 15 | 1.1 | 45.5 | 387 | 78.6 | 6.09 |
| 0.1 M HNO₃ | 94.48 | 15 | 1.1 | 24.2 | 271 | 78.1 | 4.83 |
| 0.1 M HNO₃ | 94.96 | 15 | 1.1 | 13.9 | 181 | 78.8 | 3.20 |
| 0.1 M HNO₃ | 95.44 | 15 | 1.1 | 8.37 | 115 | 76.9 | 1.90 |
| 0.1 M HNO₃ | 95.92 | 15 | 1.1 | 4.06 | 60.9 | 82.4 | 0.802 |
| 0.1 M HNO₃ | 96.40 | 15 | 1.1 | 2.11 | 28.9 | 80.1 | 0.260 |
| 0.1 M HNO₃ | 96.88 | 15 | 1.1 | 2.17 | 18.8 | 94.3 | 0.151 |
| 0.1 M HNO₃ | 97.08 | 15 | 1.1 | 1.98 | 13.2 | 90.6 | 0.063 |
| 1 M HNO₃ | 97.59 | 14 | 1.0 | 2.38 | 10.4 | 91.5 | 0.165 |
| 1 M HNO₃ | 98.10 | 14 | 1.0 | 4.16 | 12.7 | 420 | 0.081 |
| 1 M HNO₃ | 98.61 | 14 | 0.3 | 3.04 | 9.43 | 772 | 0.078 |
| 1 M HNO₃ | 99.12 | 12 | 0.0 | 1.11 | 2.34 | 493 | 0.020 |
| 1 M HNO₃ | 99.63 | 12 | 0.0 | 0.825 | 1.54 | 239 | 0.043 |
| 1 M HNO₃ | 100.14 | 12 | 0.0 | 0.695 | 0.943 | 122 | 0.012 |
| 1 M HNO₃ | 100.65 | 12 | 0.0 | 0.628 | 0.728 | 60.9 | 0.008 |
| 1 M HNO₃ | 101.16 | 12 | 0.0 | 0.793 | 0.731 | 34.5 | 0.024 |

[a]This is the number of total cumulative column volumes, and it includes 60 column volumes of WVI influent as detailed in Table IVB.

It is apparent from the foregoing description of the invention and the illustrative examples that several changes and modifications may be made therein which are within the contemplation of this invention and are, therefore, obvious from the disclosure herein. For example, the process of this invention may be carried out in continuous manner which is best suited for economical and industrial operations, or it may be carried out semi-continuously or batchwise. From the standpoint of efficiency and economy, however, continuous operation constitutes the preferred method.

What is claimed is:

1. A method of removing radioactive cations from a liquid containing the same by passage of said liquid through a regenerable ion exchange medium of porous silicate glass or silica gel characterized by an interconnected porous structure and a plurality of $\equiv$Si—O—Z groups wherein Z represents a non-radioactive cation selected from the group consisting of hydrogen, alkali metal, Group Ib metal, ammonium and mixtures thereof, said method comprising:
   (a) contacting said ion exchange medium with said liquid whereby said non-radioactive cations of said ion exchange medium are displaced by said radioactive cations of said liquid to provide a plurality of groups of radioactive cations bonded to Si through divalent oxygen (—O—);
   (b) contacting said ion exchange medium containing radioactive cations bonded thereto of step (a) with an aqueous solution of an acid to displace said radioactive cations with the proton of said acid thereby providing a plurality of $\equiv$Si—O—H groups;

(c) regenerating said ion exchange medium by contacting the ion exchange medium of step (b) with an aqueous basic solution of an alkali metal or ammonium ion to provide a regenerated ion exchange medium having a plurality of ≡Si—O—A groups wherein A represents a non-radioactive cation selected from the group consisting of alklai metal, ammonium and mixtures thereof, and (d) contacting the regenerated ion exchange medium of step (c) with additional liquid containing radioactive cations thereby effecting a displacement of said non-radioactive cations with radioactive cations.

2. A method as in claim 1 wherein said ion exchange medium is a porous silicate glass or silica gel having at least about 70 mol percent $SiO_2$.

3. A method as in claim 1 wherein said acid is $HNO_3$, HCl, $H_2SO_4$, $H_3PO_4$ or $HClO_4$.

4. A method as in claim 1 further including the steps of removing the aqueous acidic solution, neutralizing the same with sufficient amount of a base to raise its pH to above about 4 and passing the resulting neutralized solution through an ion exchange medium.

5. A method as in claim 1 wherein in step (c) said aqueous basic solution is an alkali metal nitrate and ammonium hydroxide solution.

6. A continuous method of removing radioactive cations from liquid waste containing the same by passage of said liquid waste through a regenerable ion exchange medium of porous silicate glass or silica gel characterized by an interconnected porous structure and a plurality of ≡Si—O—Z groups wherein Z represent a non-radioactive cation selected from the group consisting of hydrogen, alkali metal, Group Ib metal, ammonium, and mixtures thereof, said method comprising:

(a) continuously passing a stream of said liquid waste through said ion exchange medium to displace said non-radioactive cations of said ion exchange medium with radioactive cations of said liquid waste to provide a plurality of groups of radioactive cations bonded to Si through divalent oxygen (—O—);

(b) interrupting the flow of said liquid waste and passing a mineral acid through the ion exchange medium containing radioactive ions of step (a) thereby displacing said radioactive cations with hydrogen and providing a plurality of ≡Si—O—H groups;

(c) regenerating said ion exchange medium by passing through the ion exchange medium of step (b) an aqueous basic solution of alkali metal or ammonium ions; and (d) continuously passing an additional quantity of said liquid waste stream through the ion exchange medium of step (c).

7. A method as in claim 6 wherein said ion exchange medium is a porous silicate glass or silica gel having at least about 70 mol percent $SiO_2$.

8. A method as in claim 6 wherein said mineral acid is $HNO_3$, HCl, $H_2SO_4$, $H_3PO_4$ or $HClO_4$.

9. A method as in claim 6 wherein said mineral acid is $HNO_3$.

10. The method of claim 6 wherein said liquid radioactive waste stream is passed through said porous glass until the glass is substantially spent.

11. The method of claim 6 further including the steps of removing the aqueous acidic solution, neutralizing the same with sufficient amount of a base to raise its pH to above about 4 and passing the resulting neutralized solution through an ion exchange medium.

12. The method of claim 11 wherein said neutralization is effected by first evaporating most of the acid solution and thereafter adding sufficient amount of a base thereto to raise its pH to above about 4.

13. The method of claim 11 wherein said neutralized solution is passed through a different ion exchange zone containing the same ion exchange medium.

14. The method of claim 6 wherein in step (c) the aqueous basic solution is alkali metal nitrate and ammonium hydroxide.

15. A method of removing radioactive cations from liquid waste containing the same by contacting said liquid waste with an ion exchange medium and regenerating the said ion exchange medium for further use, said ion exchange medium being porous silicate glass or silica gel characterized by an interconnected porous structure and a plurality of ≡Si—O—Z groups wherein Z represents a non-radioactive cation selected from the group consisting of hydrogen, alkali metal, Group Ib metal, and ammonium cations, and mixtures thereof, said method comprising:

(a) contacting said ion exchange medium with said liquid waste to thereby displace said non-radioactive cations of said ion exchange medium with radioactive cations of said liquid waste to provide a plurality of groups of radioactive cations bonded to Si through divalent oxygen (—O—);

(b) contacting said ion exchange medium containing radioactive ions of step (a) with an aqueous solution of an acid to displace said radioactive cations with hydrogen thereby providing a plurality of ≡Si—O—H groups; and (c) contacting said ion exchange medium of step (b) with an aqueous solution of an alkali metal nitrate and ammonium hydroxide to thereby regenerate said ion exchange medium containing non-radioactive ions.

16. A method as in claim 15 wherein in step (c) said alkali metal nitrate is sodium nitrate.

17. A method as in claim 15 wherein said ion exchange medium is a porous silicate glass or silica gel having at least about 70 mol percent $SiO_2$.

18. A method as in claim 15 wherein said ion exchange medium is a porous silicate glass.

19. A method as in claim 15 wherein said ion exchange medium is porous silica gel.

20. A method of removing radioactive cations from liquid containing the same by passage of a radioactive liquid through an ion exchange medium of porous silicate glass or silica gel characterized by an interconnected porous structure and a plurality of ≡Si—O—Z groups wherein Z represents a non-radioactive cation selected from the group consisting of hydrogen, alkali metal, Group Ib metal, ammonium, and mixtures thereof, which comprises:

(a) impregnating the interconnecting pores of said porous silicate glass or silica gel with a liquid containing radioactive cations having a pH above about 9.5 and an alkali content above about 1M whereby said non-radioactive cations of the glass are displaced by said radioactive cations of said liquid to provide a plurality of groups of radioactive cations bonded to Si through divalent oxygen (—O—);

(b) impregnating the ion exchange medium of porous silicate glass or silica gel containing radioactive cations bonded thereto of step (a) with an aqueous solution of an acid to displace said radioactive cations with the proton of said acid thereby providing a plurality of ≡Si—O—H groups; and (c) impregnating the ion exchange medium of step (b) with additional said liquid containing radioactive cations thereby effecting a displacement of said protons or said non-radioactive cations with radioactive cations.

21. A method as in claim 20 wherein, after step (b) and before step (c), a weak or dilute basic solution is passed through the ion exchange medium to raise the pH of the medium and avoid generation of gas during step (c).

22. A method as in claim 21 wherein said weak basic solution has a pH of about 9 to 12.

23. A method as in claim 22 wherein said weak basic solution is a solution of sodium borate or sodium phosphate.

24. A method of removing radioactive cations from liquid containing the same by passage of a radioactive liquid through an ion exchange medium of porous silicate glass or silica gel characterized by an interconnected porous structure and a plurality of ≡Si—O—Z groups wherein Z represents a non-radioactive hydrogen cation, which comprises impregnating the interconnected pores of said porous silicate glass or silica gel with a liquid containing radioactive cations having a pH above about 9.5 and an alkali content above about 1M whereby said non-radioactive hydrogen cations of the glass are displaced by said radioactive cations of said liquid to provide a plurality of groups of radioactive cations bonded to Si through divalent oxygen (—O—).

25. A method as in claim 24 wherein before the impregnation step a weak or dilute basic solution is passed through the ion exchange medium to raise, the pH of the medium and avoid generation of gas during, impregnation.

26. A method of regenerating an ion exchange medium of porous silicate glass or silica gel having an interconnecting porous structure and a plurality of radioactive cations bonded to silica through divalent oxygen (—O—), said method comprising contacting said ion exchange medium with an aqueous solution of an acid to displace said radioactive cations with the proton of said acid thereby providing a plurality of ≡Si—O—H groups and thereafter contacting the resulting ion exchange medium with an aqueous basic solution of an alkali metal or ammonium ion.

27. A method as in claim 26 wherein said alkali metal is sodium nitrate and said ammonium is ammonium hydroxide.

28. A method as in claim 26 wherein said acid is HNO₃.

29. A method as in claim 26 wherein said ion exchange medium is porous silicate glass.

30. A method of regenerating an ion exchange medium of porous silicate glass or silica gel having a plurality of non-radioactive cations and a plurality of radioactive cations bonded to silica through divalent oxygen (—O—), and of segregating the non-radioactive cations from the radioactive cations, said method comprising passing an acid through said ion exchange medium to displace said cations with the proton of said acid thereby providing a plurality of ≡Si—O—H groups and thereafter collecting a first fraction of effluent from said ion exchange medium containing a relatively higher concentration of non-radioactive cations and subsequently collecting a second fraction of effluent containing a relatively higher concentration of radioactive cations.

31. A method as in claim 30 wherein said second fraction is distinguished from said first fraction by monitoring the pH of said effluent and collecting said second fraction when said pH drops below a predetermined level.

32. A method as in claim 31 wherein said second fraction is collected when said pH drops below about 7.

33. A method as in claim 31 wherein said second fraction is collected when said pH drops below about 4.

34. A method of separating or purifying cations contained in a liquid by passage of said liquid through a regenerable ion exchange medium of porous silicate glass or silica gel characterized by an interconnected porous structure and a plurality of ≡Si—O—Z groups wherein Z represents a cation selected from the group consisting of hydrogen, alkali metal, Group Ib metal, ammonium and mixtures thereof, said method comprising:

(a) passing said liquid through said ion exchange medium to displace said Z cations with cations contained in said liquid to provide a plurality of the latter cations bonded to Si through divalent oxygen (—O—);

(b) interrupting the flow of said liquid and passing an acid through said ion exchnage medium containing cations of step (a) to displace said cations with the proton of said acid thereby providing a plurality of ≡Si—O—H groups and thereafter collecting effluent from said ion exchange medium in at least two separate fractions, each fraction containing different relative concentrations of cations displaced from the ion exchange medium.

35. A method as in claim 34 wherein at least one of said cations separated or purified is radioactive.

36. A method as in claim 34 wherein said fractions are distinguished from each other by monitoring the pH of said effluent and collecting said various fractions when the pH drops below a pre-determined level.

37. A method as in claim 34 wherein more than one acid composition is used to displace said cations from said ion exchange medium, using successively stronger or more concentrated acid compositions and collecting the effluent of said acid compositions in separate fractions to obtain separation or purification of cations displaced from said ion exchange medium.

38. A method as in claim 34 wherein following steps (a) and (b) said ion exchange medium is (c) regenerated by passing through it an aqueous basic solution of an alkali metal or ammonium ion to provide a regenerated ion exchange medium having a plurality of ≡Si—O—A groups wherein A represents a cation selected from the group consisting of alkali metal, ammonium and mixtures thereof; and (d) passing through the regenerated ion exchange medium of step (c) additional liquid containing cations to be separated or purified thereby effecting a displacement of said A cations with cations contained in said additional liquid.

* * * * *